US012624984B2

(12) United States Patent
Norrdal et al.

(10) Patent No.: US 12,624,984 B2
(45) Date of Patent: May 12, 2026

(54) FOOD SERVING SYSTEM

(71) Applicant: Turun Yliopisto, Turun yliopisto (FI)

(72) Inventors: Mari Norrdal, Turun yliopisto (FI);
Juhani Naskali, Turun yliopisto (FI);
Ilmo Setälä, Turun yliopisto (FI);
Osmo Someroja, Turun yliopisto (FI)

(73) Assignee: TURUN YLIOPISTO, Turun Yliopisto (FI)

( * ) Notice: Subject to any disclaimer, the term of this patent is extended or adjusted under 35 U.S.C. 154(b) by 247 days.

(21) Appl. No.: 17/778,666

(22) PCT Filed: Nov. 19, 2020

(86) PCT No.: PCT/FI2020/050782
§ 371 (c)(1),
(2) Date: May 20, 2022

(87) PCT Pub. No.: WO2021/099692
PCT Pub. Date: May 27, 2021

(65) Prior Publication Data
US 2022/0412792 A1      Dec. 29, 2022

(30) Foreign Application Priority Data
Nov. 22, 2019     (FI) ..................................... 20196007

(51) Int. Cl.
*G01G 19/414*        (2006.01)
*G01G 19/415*        (2006.01)
*G01G 19/52*         (2006.01)
(52) U.S. Cl.
CPC ....... *G01G 19/4144* (2013.01); *G01G 19/415* (2013.01); *G01G 19/52* (2013.01)

(58) Field of Classification Search
CPC ... G01G 19/4144; G01G 19/415; G01G 19/52
(Continued)

(56) References Cited

U.S. PATENT DOCUMENTS

2013/0284806 A1*  10/2013  Margalit .............. G07G 1/0009
                                                        235/382
2017/0024692 A1    1/2017  Sambrailo
(Continued)

FOREIGN PATENT DOCUMENTS

EP            2438408 B1 *  2/2020  ............. G16Z 99/00
JP      2000149141 A        5/2000
(Continued)

OTHER PUBLICATIONS

International Search Report and Written Opinion dated Jan. 29, 2021 for corresponding International Application No. PCT/FI2020/050782.
(Continued)

*Primary Examiner* — Michael G Lee
*Assistant Examiner* — David Tardif
(74) *Attorney, Agent, or Firm* — Tarolli, Sundheim, Covell & Tummino LLP

(57) ABSTRACT

According to an aspect, there is provided a food serving system that is able to link weighed food amounts to a single user regardless of the fact whether the user is separately identified or not. According to another aspect, there is provided a method comprising receiving weighing results associated with an identifier from at least one control unit associated with a plurality of food collecting points; and generating a total result associated with the identifier based on the weighing results associated with the identifier.

22 Claims, 13 Drawing Sheets

(58) Field of Classification Search
    USPC ........................................................ 235/383
    See application file for complete search history.

(56)                          References Cited

U.S. PATENT DOCUMENTS

| | | | |
|---|---|---|---|
| 2019/0290073 A1 | 9/2019 | Veltrop | |
| 2020/0365250 A1* | 11/2020 | Kim ........................ | G16H 20/60 |
| 2023/0145313 A1* | 5/2023 | Gong ...................... | A23L 33/30 |
| | | | 702/129 |

FOREIGN PATENT DOCUMENTS

| | | | | |
|---|---|---|---|---|
| JP | 2005010951 A | 1/2005 | | |
| JP | 2019091331 A | 6/2019 | | |
| WO | WO-2010139862 A1 * | 12/2010 | ......... | G01G 19/4146 |
| WO | 2012121616 A1 | 9/2012 | | |
| WO | 2013086372 A1 | 6/2013 | | |

OTHER PUBLICATIONS

Finnish Search Report dated Jun. 2, 2020 for corresponding application No. FI 20196007.
Japanese Notice for Reasons for Rejection dated Dec. 3, 2024 in the Japanese Patent Application No. 2022-528721.

* cited by examiner

| 122A | 122B | 122C |
|---|---|---|
| WASTE POINT | WASTE POINT | WASTE POINT |
| DISPLAY 130A | DISPLAY 130B | DISPLAY 130C |
| WASTE COLLECTION POINT 140A | WASTE COLLECTION POINT 140B | WASTE COLLECTION POINT 140C |
| WEIGHING DEVICE 128A | WEIGHING DEVICE 128B | WEIGHING DEVICE 128C |
| READER 126A | READER 126B | READER 126C |
| CONTROL UNIT 124A | CONTROL UNIT 124B | CONTROL UNIT 124C |

FIG. 1C

| 112A | 112B | 112C |
|---|---|---|
| IDENTIFICATION POINT | IDENTIFICATION POINT | IDENTIFICATION POINT |
| DISPLAY 120A | DISPLAY 120B | DISPLAY 120C |
| READER 1 116A | READER 1 116A | READER 1 116A |
| READER 2 118A | READER 2 118A | READER 2 118A |
| CONTROL UNIT 114A | CONTROL UNIT 114B | CONTROL UNIT 114C |

FIG. 1D

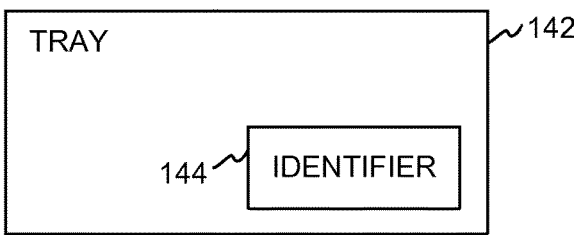

FIG. 1E

TIME

| 0g | 580g | 750g | 790g | 850g | 848g | 850g | 870g | 620g | 0g |

FOOD SERVING SYSTEM

RELATED APPLICATIONS

The present application is a U.S. National Stage application under 35 USC 371 of PCT Application Serial No. PCT/FI2020/050782, filed on 19 Nov. 2020, which claims priority from FI application No. 20196007, filed on 22 Nov. 2019, the entirety of each of which is incorporated herein by reference.

TECHNICAL FIELD

The present disclosure relates to the field of data processing in general, and to a solution for operating a food serving system and for managing the food serving system.

BACKGROUND

There exists solutions for tracking the amount of consumed food by people having, for example, a lunch, and linking the consumed food to identified users. For example, a line serving lunch may be provided with weighing devices in connection with the served dishes and readers for reading user-associated identifiers, for example, from smart cards. At a specific food collecting point, the user may first be identified with the smart card, and after that, the user may take a desired amount of a dish. The amount taken by the user is weighed and the weight information is associated with the user. By identifying the user at multiple food collecting points and associating the food weight information with the user, it is possible determine, for example, energy contents of the food selected by the user.

However, a problem with at least some of the existing solutions is, for example, that information about food consumption is obtained only for users that use user-specific identification means, for example, smart cards to identify themselves. If a user does not have smart card, food collected and weighted by such a user cannot be linked to any user.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the present disclosure to provide a technical solution for enabling linking weighed food amounts to a single user regardless of the fact whether the user is separately identified or not.

The object above is achieved by the features of the independent claims in the appended claims. Further embodiments and examples are apparent from the dependent claims, the detailed description and the accompanying drawings.

According to a first aspect, there is provided a food serving system. The system comprises a plurality of food serving points configured to serve food; a plurality of food collecting points configured to receive a tray, each food collecting point being associated with a food serving point, a control unit, a weighing device connected to the control unit and configured to weigh a tray of a user, and a reader connected to the control unit and configured to read an identifier. Each control unit associated with the plurality of food collecting points is configured to start a weighing event when detecting a change in weight with the weighing device associated with the food collecting point, in response to the start, associate the identifier read with the reader associated with the food collecting point with the weighing event, generate at least one weighing result with the weighing device associated with the food collecting point, and stop the weighing event when detecting no weight with the weighing device associated with the food collecting point; and a management unit configured to receive weighing results associated with the identifier from at least one control unit associated with the plurality of food collecting points and generate a total result associated with the identifier based on the weighing results.

In an implementation form of the first aspect, the identifier is associated with at least one of the tray, a user or a mobile device of the user.

In an implementation form of the first aspect, the management unit is configured to start a new session when detecting the identifier for the first time.

In an implementation form of the first aspect, the system further comprises a tray returning point comprising a reader configured to read an identifier when the tray is returned, and the management unit is configured to end an existing session associated with the identifier in response to the reading.

In an implementation form of the first aspect, the management unit is configured to end an existing session associated with the identifier when failing to register the identifier at the tray returning point within a predetermined period of time.

In an implementation form of the first aspect, the system further comprises a waste point comprising an associated reader configured to read the identifier when the tray is returned, wherein the waste point further comprises a waste collection point and a weighing device configured to weigh the amount of biowaste left by a user to the waste collection point, wherein management unit is configured to receive from the waste point the identifier and weighed weight of the biowaste.

In an implementation form of the first aspect, the management unit is configured to receive from a food collecting point at least one information pair associated with a weighing result of a tray, wherein each information pair comprises a weighing result and an indication whether the identifier was read correctly or incorrectly, and the management unit is configured to calculate a sub total result associated with the food collecting point by subtracting the first weighing result associated with an indication that the identifier was read correctly from the last weighing result associated with an indication that the identifier was read correctly.

In an implementation form of the first aspect, the system further comprises a display associated with a food collecting point, wherein the management unit is configured to control the display to display at least one of the following: instructions for the weighing event at the food collecting point; a name of a dish served at a food serving point associated with the food collecting point; and additional information about the dish served at the food serving point.

In an implementation form of the first aspect, the system further comprises an identification point comprising a first reader configured to read the identifier and a second reader configured to read a user identifier, wherein the management unit is configured to receive from the identification point the identifier and the user identifier, and link the identifier with the user identifier.

In an implementation form of the first aspect, the management unit is configured to receive from the identification point at least one additional food associated selection and link the at least one additional food associated selection with the user identifier.

According to a second aspect, there is provided a method comprising receiving weighing results associated with an identifier from at least one control unit associated with a plurality of food collecting points; and generating a total result associated with the identifier based on the weighing results associated with the identifier.

In an implementation form of the second aspect, the method further comprises starting a new session when detecting the identifier for the first time.

In an implementation form of the second aspect, the method further comprises receiving, from a tray returning point, an identifier when the tray is returned; and ending an existing session associated with the identifier.

In an implementation form of the second aspect, the method further comprises ending an existing session associated with the identifier when failing to receive the identifier from the tray returning point within a predetermined period of time.

In an implementation form of the second aspect, the method further comprises receiving from a food collecting point at least one information pair associated with a weighing result of a tray, wherein each information pair comprises a weighing result and an indication whether the identifier was read correctly or incorrectly; and calculating a sub total result associated with the food collecting point by subtracting the first weighing result associated with an indication that the identifier was read correctly from the last weighing result associated with an indication that the identifier was read correctly.

In an implementation form of the second aspect, the method further comprises controlling a display associated with a food collecting point to display at least one of the following:

instructions for the weighing event at the food collecting point; a name of a dish served at a food serving point associated with the food collecting point; and additional information about the dish served at the food serving point.

In an implementation form of the second aspect, the method further comprises receiving from an identification point the identifier and a user identifier; and linking the identifier with the user identifier.

In an implementation form of the second aspect, the method further comprises receiving from the identification point at least one additional food associated selection; and linking the at least one additional food associated selection with the user identifier.

In an implementation form of the second aspect, the identifier is associated with at least one of the tray, a user or a mobile device of the user.

According to a third aspect, there is provided an apparatus comprising at least one processor and at least one memory including computer program code. The at least one memory and the computer program code are configured to, with the at least one processor, cause the user node to at least perform: receiving weighing results associated with an identifier from at least one control unit associated with a plurality of food collecting points; and generating a total result associated with the identifier based on the weighing results associated with the identifier.

In an implementation form of the third aspect, the at least one memory and the computer program code are configured to, with the at least one processor, cause the user node to at least perform: starting a new session when detecting the identifier for the first time.

In an implementation form of the third aspect, the at least one memory and the computer program code are configured to, with the at least one processor, cause the user node to at least perform: receiving, from a tray returning point, an identifier when the tray is returned; and ending an existing session associated with the identifier.

In an implementation form of the third aspect, the at least one memory and the computer program code are configured to, with the at least one processor, cause the user node to at least perform: ending an existing session associated with the identifier when failing to receive the identifier from the tray returning point within a predetermined period of time.

In an implementation form of the third aspect, the at least one memory and the computer program code are configured to, with the at least one processor, cause the user node to at least perform: receiving from a food collecting point at least one information pair associated with a weighing result of a tray, wherein each information pair comprises a weighing result and an indication whether the identifier was read correctly or incorrectly; and calculating a sub total result associated with the food collecting point by subtracting the first weighing result associated with an indication that the identifier was read correctly from the last weighing result associated with an indication that the identifier was read correctly.

In an implementation form of the third aspect, the at least one memory and the computer program code are configured to, with the at least one processor, cause the user node to at least perform: receiving from a food collecting point at least one information pair associated with a weighing result of a tray, wherein each information pair comprises a weighing result and an indication whether the identifier was read correctly or incorrectly; and calculating a sub total result associated with the food collecting point by subtracting the first weighing result associated with an indication that the identifier was read correctly from the last weighing result associated with an indication that the identifier was read correctly.

In an implementation form of the third aspect, the at least one memory and the computer program code are configured to, with the at least one processor, cause the user node to at least perform: controlling a display associated with a food collecting point to display at least one of the following: instructions for the weighing event at the food collecting point; a name of a dish served at a food serving point associated with the food collecting point; and additional information about the dish served at the food serving point.

In an implementation form of the third aspect, the at least one memory and the computer program code are configured to, with the at least one processor, cause the user node to at least perform: receiving from an identification point the identifier and a user identifier;

and linking the identifier with the user identifier.

In an implementation form of the third aspect, the at least one memory and the computer program code are configured to, with the at least one processor, cause the user node to at least perform: receiving from the identification point at least one additional food associated selection; and linking the at least one additional food associated selection with the user identifier.

According to a fourth aspect, there is provided a computer program comprising program code which, when executed by at least one processor, performs the method of the second aspect.

According to a fifth aspect, there is provided a computer-readable medium comprising a computer program comprising program code which, when executed by at least one processor, performs the method of the second aspect.

Other features and advantages of the present invention will be apparent upon reading the following detailed description and reviewing the accompanying drawings.

BRIEF DESCRIPTION OF THE DRAWINGS

The essence of the present invention is explained below with reference to the accompanying drawings in which:

FIG. 1C illustrates a block diagram of a waste point according to an example embodiment.

FIG. 1D illustrates a block diagram of an identification point according to an example embodiment.

FIG. 1E illustrates a tray according to an example embodiment.

DETAILED DESCRIPTION

Figure 1A:
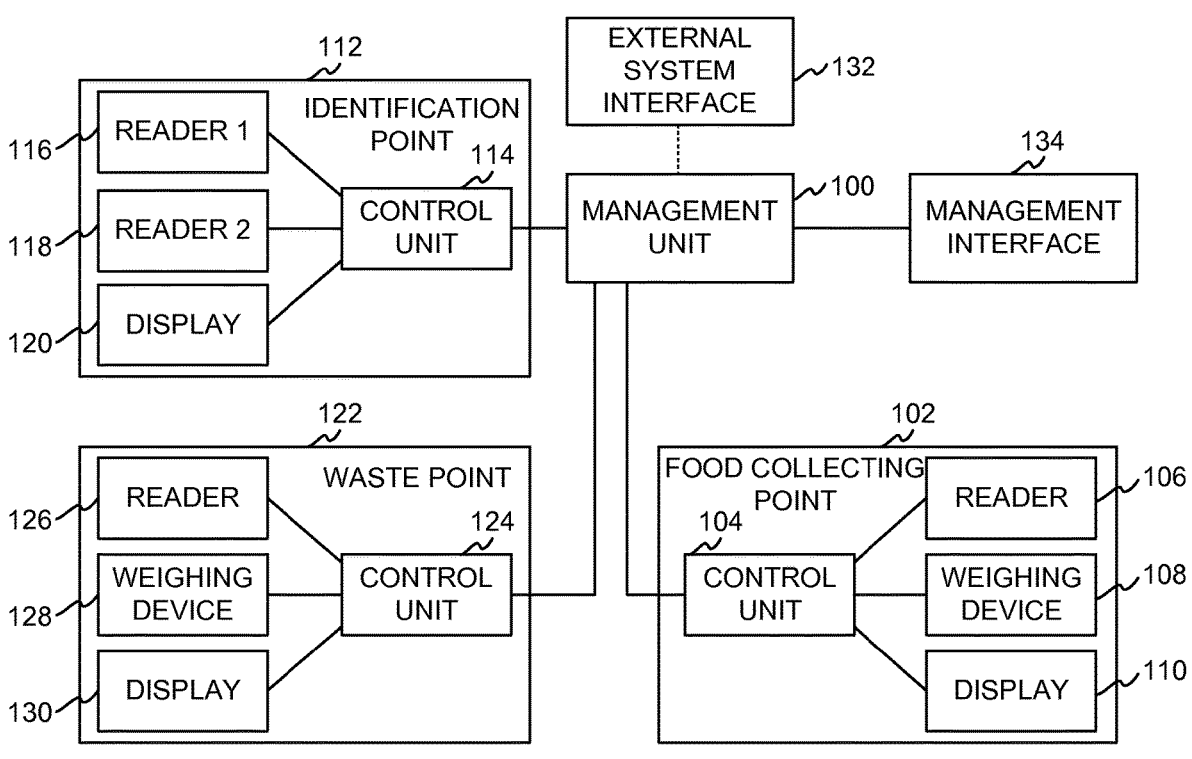
FIG. 1A illustrates a food serving system according to an example embodiment.
Figure 1B:
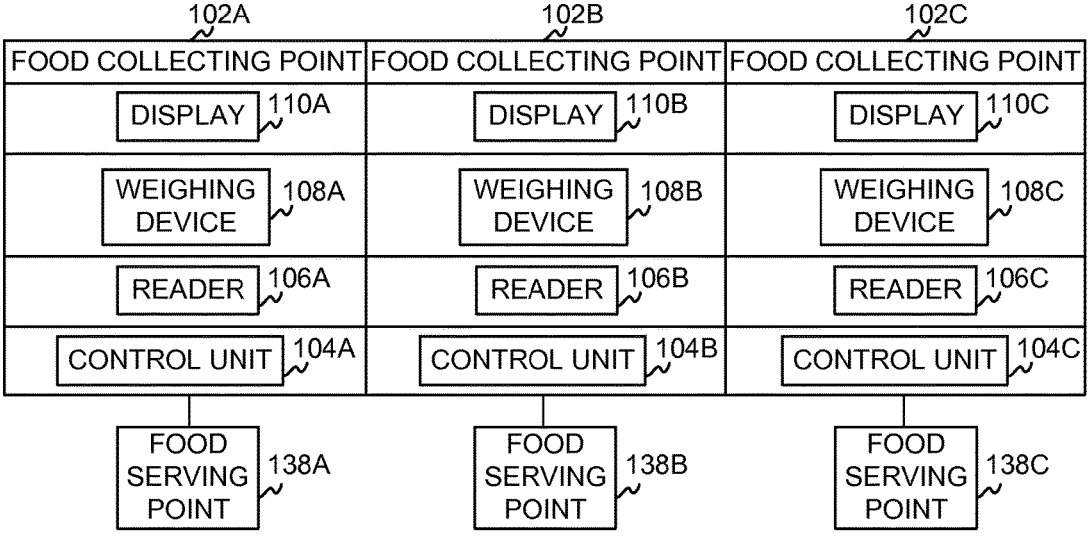
FIG. 1B illustrates a block diagram of a food collecting point according to an example embodiment.

In the following description, references are made to the accompanying drawings, which form part of the present disclosure, and in which are shown, by way of illustration, specific aspects, embodiments and examples in which the present disclosure may be placed. It is understood that other aspects may be utilized and structural or logical changes may be made without departing from the scope of the present disclosure. The following detailed description, therefore, is not to be taken in a limiting sense, as the scope of the present disclosure is defined by the appended claims. Further, the present disclosure can be embodied in many other forms and should not be construed as limited to any certain structure or function disclosed in the following description.

According to the detailed description, it will be apparent to ones skilled in the art that the scope of the present disclosure covers any embodiment of the present invention, which is disclosed herein, irrespective of whether this embodiment is implemented independently or in concert with any other embodiment of the present disclosure. For example, system disclosed herein can be implemented in practice by using any numbers of the embodiments provided herein. Furthermore, it should be understood that any embodiment of the present disclosure can be implemented using one or more of the elements presented in the appended claims.

As used herein, the term "food serving point" may refer to any point where food is served. Further, one or more dishes may be served at a single food serving point. In an example embodiment, each dish may be served at a separate food serving point. For example, a food serving point may comprise a location at which a served dish is arranged and from which a user may take a user-selected amount of the dish onto his/her plate. Multiple food serving points may be arranged at a single location.

As used herein, the term "food collecting point" may refer to a point in connection with a food serving point at which the user may place a tray and one more dishes, for example, a plate carried by the tray. Each food collecting point may also comprise a weighing device configured to weigh the tray positioned at the food collecting point. Multiple food collecting points may be arranged at a single location.

As used herein, the term "tray" refers to an object that can be used to carry one or more other items, for example, plates, glasses etc. The tray may take any appropriate form, for example, its shape may be rectangular, rounded rectangular, round etc. Each tray may be associated with an identifier that may uniquely identify a tray among all trays used in the food collecting points. The identifier may be provided, for example, by a wirelessly readable tag, for example, a near field communication (NFC) tag, a radio frequency identification (RFID) tag or visually readable tag. The identifier may be provided, for example, also by a visually readable code or identifier, for example, a QR code, a bar code etc. In an example embodiment, the identifier may be a characteristic of the tray itself. For example, a tag comprising the identifier may be fixedly attached to the tray, for example, glued on a bottom side of the tray or incorporated into the tray. In another example embodiment, the visually readable code or identifier may be, for example, printed on the tray or attached to the tray, for example, as a sticker. Yet in another example embodiment, the identifier may be provided by a separate device or a tag that may be associated with a user or with the user's device. For example, a mobile device put on the tray may provide the identifier. The identifier may thus be provided, for example, via a wireless transmission, for example, by using Bluetooth, RFID, NFC, Wi-Fi etc. Thus, in an example embodiment, the identifier may be associated with a user or with a mobile device of a user instead of the tray. Therefore, although the example embodiments discussed below may use the identifier as being associated with a tray, the identifier may alternatively be associated, for example, with a user or with a mobile device of the user. Further, the identifier may be unique among the identifiers used within a specific food serving system, or the identifier may be globally unique among all identifiers. The identifier may also be unique among all identifiers used by a specific device or device type. The identifier may be, for example, a serial number or a code associated with a device or component, or any other identifier that can be used for identification purposes.

Further, as used herein the term "reader" may refer to any type of a reader that is able to read or recognize an identifier. The reader may apply, for example, near field communication (NFC), a radio frequency identification (RFID) or visual recognition. The visual recognition may refer, for example, to a solution where the reader is able to read visually readable codes or identifiers, for example, QR codes, bar codes etc.

Alternatively, the visual recognition may refer to a solution that is based on recognizing information from an image or images from a camera. Further, the reader may be configured to read the identifier continuously or at preset intervals. The reader may also be configured to read the identifier after receiving an instruction to read the identifier.

FIG. 1A illustrates a food serving system according to an example embodiment. The embodiment illustrated in FIG. 1A is discussed together with FIGS. 1B-1E.

The system comprises a management unit 100 connected to at least one food collecting point 102, 102A, 102B, 102C. The food collecting point 102, 102A, 102B, 102C is configured to receive a tray 142 carried by a user. Each food collecting point 102, 102A, 102B, 102C may be associated with a corresponding food serving point 138A, 138B, 138C. From the food serving point 138A, 138B, 138C a user is able to take a desired amount of food. The food collecting point 102, 102A, 102B, 102C comprises a control unit 104, 104A, 104B, 104C, a weighing device 108, 108A, 108B, 108C connected to the control unit 104, 104A, 104B, 104C and configured to weigh a tray 142 of a user, and a reader 106, 106A, 106B, 106C connected to the control unit 104, 104A, 104B, 104C and configured to read an identifier 144 associated with the tray 142. The food collecting point 102, 102A, 102B, 102C may comprise also a display 110, 110A, 110B, 110C configured to display information associated with the food collecting point 102, 102A, 102B, 102C and/or the food serving point 138A, 138B, 138C. Each control unit 104, 104A, 104B, 104C associated with the plurality of food collecting points 102, 102A, 102B, 102C is configured to start a weighing event when detecting a change in weight with the weighing device 108, 108A, 108B, 108C associated with the food collecting point 102, 102A, 102B, 102C. In response to the start, the control unit 104, 104A, 104B, 104C is configured to associate the identifier 144 associated with the tray 142 read with the reader 106, 106A, 106B, 106C with the weighing event. Further, the control unit 104, 104A, 104B, 104C is configured generate at least one weighing result with the weighing device 108, 108A, 108B, 108C and to stop the weighing event when detecting no weight with the weighing device 108, 108A, 108B, 108C. In addition to the food serving points 138A, 138B, 138C, the system may comprise one or more additional food serving points which are not associated with weighing devices, for example, a grill point, a dessert point, a beverage point, a soup point, salad point, bread point etc.

In an example embodiment, the reader 106, 106A, 106B, 106C may be configured to read the identifier, for example, continuously or at preset intervals. In another example embodiment, the reader 106, 106A, 106B, 106C may be configured to read the identifier after receiving an instruction to read the identifier. Further, when the control unit 104, 104A, 104B, 104C associates the identifier 144 read with the reader 106, 106A, 106B, 106C with the weighing event, the control unit 104, 104A, 104B, 104C may use the last read identifier as the identifier to be associated with the weighing event. Alternatively, when the control unit 104, 104A, 104B, 104C starts the weighing event, the control unit 104, 104A, 104B, 104C may be configured to instruct the reader 106, 106A, 106B, 106C to read the identifier and associate the read identifier with the weighing event. Further, in an example embodiment, if the control unit 104, 104A, 104B, 104C receives a read identifier from the reader 106, 106A, 106B, 106C after the weighing event has already started, the control unit 104, 104A, 104B, 104C may set this identifier as the identifier associated with the weighing event.

The management unit 100 is configured to receive weighing results associated with the identifier 144 from at least one control unit 104, 104A, 104B, 104C associated with the food collecting points 102, 102A, 102B, 102C and to generate a total result associated with the identifier 144 based on the weighing results. In other words, the management unit 100 is able to link all the received weighing results associated with different food collecting points 102, 102A, 102B, 102C to specific identifiers.

The system may also comprise at least one identification point 112, 112A, 112B, 112C. The identification point 112, 112A, 112B, 112C may comprise a first reader 116, 116A, 116B, 116C configured to read the identifier 144 associated with the tray 142 and a second reader 118, 118A, 118B, 118C configured to read a user identifier. In an example embodiment, the second reader 118, 118A, 118B, 118C may comprise a QR code reader or a close range wireless communication reader. The management unit 100 is then configured to receive from the identification point 112, 112A, 112B, 112C the identifier 144 associated with the tray 142, and the user identifier, and link the identifier 144 associated with the tray 142 with the user identifier. As the management unit 100 has earlier received weighing results that have been associated with identifiers of trays, after receiving the identifier 144 associated with the tray 142 together with the user identifier, the management unit 100 is able to establish a link between a specific user and a specific identifier 144 of a tray 142.

In an example embodiment, the system may comprise at least one waste point 122, 122A, 122B, 122C comprising a control unit 124, 124A, 124B, 124C connected to a reader 126, 126A, 126B, 126C configured to read the identifier 144 associated with the tray 142 when the tray 142 is returned. The waste point 122, 122A, 122B, 122C further comprises a waste collection point 140A, 140B, 140C and a weighing device 128, 128A, 128B, 128C connected to the control unit 124, 124A, 124B, 124C and configured to weigh the amount of biowaste left by a user to the waste collection point 140A, 140B, 140C. The management unit 100 may be configured to receive from the control unit 124, 124A, 124B, 124C the identifier 144 associated with the tray 142 and weighed weight of the biowaste. The waste point 122, 122A, 122B, 122C may also comprise a display 130, 130A, 130B, 130C connected to the control unit 124, 124A, 124B, 124C. The display 130, 130A, 130B, 130C may display, for example, the weight of the biowaste left by the user. In an example embodiment, the waste point 122, 122A, 122B, 122C may be configured to determine the contents of the biowaste left by the user or estimate the contents of the biowaste left by the user. The determination or estimation may be based, for example, on identifying the biowaste contents from an image or images by a digital imaging solution. For example, an image of the tray of the user may be taken prior to the user places the biowaste to the waste collection point 140A, 140B, 140C.

The system may also comprise a management interface 134 that may be used to configure information displayed by the displays 110, 110A, 110B, 110C of the food collecting points 102, 102A, 102B, 102C and to manage operation of the system. For example, each display 110A, 110B, 110C may display at least one of the dish name, ingredients of the dish, and one or more additional characteristic associated with the dish (for example, that the dish is lactose free and/or glutenin free). The management interface 134 may be provided by the management unit 100, for example, as a browser-based interface.

The system may also comprise an external system interface 132 via which information, for example, about the usage of the system may be transmitted to one or more third parties.

In an example embodiment, the management unit 100 is configured to start a new session associated with a tray 142 when detecting the identifier 144 associated with the tray 142 for the first time. In other words, when a user places the tray 142 for the first time at a first food collecting point and a reading operation of the identifier 144 associated with the tray 142 is successful, the new session is started. After the start, subsequent measurement results at one or more food collecting points 102, 102A, 102B, 102C can be linked to the identifier 144.

In an example embodiment, the management unit 100 may be configured to end an existing session associated with a tray 142 when failing to register the tray 142 or the identifier 144 at the tray returning point within a predetermined period of time. Thus, the term "session" may define a time period within which the same user controls the tray 142 from a first food collecting point until returning the tray 142 at a tray returning point. This enables terminating the session even if the return of the tray was not registered in a normal manner, for example, if the user left the tray on a table.

In an example embodiment, the system may comprise a tray returning point (not illustrated in FIG. 1A) comprising a reader configured to read an identifier 144 associated with the tray 142 when the tray 142 is returned. The management unit 100 may be then configured to end an existing session associated with the tray 142 in response to the reading. The existing session may be ended right after reading the identifier 144. In another example embodiment, there may be a time delay, for example, 1-10 minutes, before the existing session is ended when the tray 142 is returned. In an example embodiment, it may happen that the tray 142 is not returned at all or that the tray returning point does not register a return of the tray 142. In this case, the management unit 100 may be configured to end an existing session associated with the tray 142 when failing to register the tray 142 at the tray returning point within a predetermined period of time, for example, within 45 minutes from a start of the session associated with the tray 142. This may happen, for example, when the tray 142 is still in use in the system but fails to appear at the tray returning point or if a user left the tray on a table without returning it.

In an example embodiment, the tray returning point and the waste point may be integrated in a single operation point.

In an example embodiment, the system may comprise an information point comprising a display and a reader configured to read the identifier 144 associated with the tray 142. The information point may be connected to the management unit 100. The information point may provide a user with a possibility to see summary information about the dishes selected by the user at that particular lunch, for example, energy contents. Thus, even if the food serving system may not identify individual users, the system is still able to provide summary information for each user before they return their trays.

The solution disclosed above may enable linking weighed food amounts to a single user regardless of the fact whether the user is separately identified or not. As each session may be identified based on an identifier associated, for example, with a tray and the identifier is obtained separately at each food collecting point, it is possible to link all the weighing results to specific trays or identifiers. This enables collection of general anonymous data about behavior and food consumption of users. This in turn enables, for example, provision of various reports and statistics based on the collected data. The solution may also enable collection statistics about the amount of waste left by users and also the composition of the waste. The collected statistics may also enable deduction of parts that cannot be eaten (for example, bones) from the statistics. The collected statistics may also enable identification of non-popular recipes and/or adaptation of recipes and food. Further, the solution may enable determination of a dining time associated with each user as starting and ending times of each session may be recorded.

Figure 2:
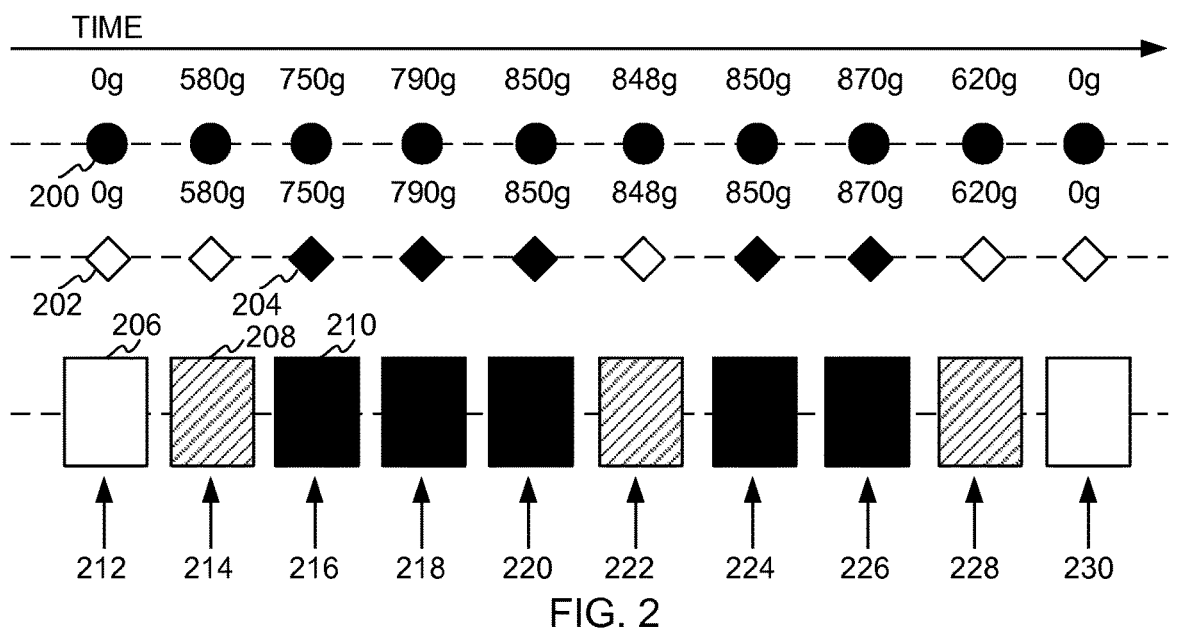
FIG. 2 illustrates an example of a weighing event performed at a food collecting point according to an example embodiment.

FIG. 2 illustrates an example of a weighing event performed at a food collecting point 102, 102A, 102B, 102C according to an example embodiment. Circles 200 indicate various phases 212-230 of the weighing event and measurements provided by a weighing device 108, 108A, 108B, 108C. Diamonds 202 indicate that an identifier associated with a tray could not be read, and diamonds 204 indicate that the identifier associated with the tray was read successfully. A reference 206 (non-filled rectangle) indicates a situation in which a weighing device fails to provide a measurement result as the tray is not placed on the weighing device. A reference 208 (diagonally filled rectangle) indicates a situation in which the tray has been partially pushed onto the weighing device and the weighing device provides a measurement result. A reference 210 (rectangle filled with black) indicates a situation in which a user has placed the tray in the middle of the weighing device and the identifier associated with the tray can be read.

At 212 the user has not yet placed the tray on the weighing device and thus no weight is detected by the weighing device. At 214 the user slides the tray partially on the weighing device but the reader associated with the food collecting point is not able to read the identifier associated with the tray yet. At 216 the user places the tray at the center of the weighing device and the reader is now able to read the identifier associated with the tray. In practice, at 216 the weight (750 g) measured by the weighing device consists of the weight of the tray and any item placed on the tray. If the weighing result at 750 g appears to be too low (for example, if the user forgot to place an empty plate on the tray), a display associated with the food collecting point may provide an indication to the user about this.

At 218 and 220 the user adds food on the plate. The user may keep the plate in his/her hand when adding food on the plate and only then place the plate again on the tray. Alternatively, the user may keep the plate on the tray all the time when adding food on the plate. At 222 there is minor decrease in weight measured by the weighing device and the tray moves sideways slightly away from the correct weighing position, and the reader is not able to read the identifier. At 224 the user again places the tray on the weighing device correctly and the reader is again able to read the identifier. At 226 the user again adds food on the plate. At 228 the user starts to move the tray forward away from the food collection point (for example, to another food collection point) and the weight measurement measured by the weighing device decreases. At the same time, the reader again may fail to read the identifier associated with the tray. At 230, the tray has completely left the weighing device.

A control unit 104, 104A, 104B, 104C at the food collecting point 102, 102A, 102B, 102C may store information pairs associated with each weighing result. Each information pair comprises a weighing result and an indication whether the identifier associated with the tray was read correctly or incorrectly. In the example illustrated in FIG. 2, the information pairs would be (580 g, false), (750 g, true), (790 g, true), (850 g, true), (848 g, false), (850 g, true) and (620 g, false). The actual increase in the weight at the food collecting point (i.e. the weight of the food selected by the user) can be calculated by subtracting the last measured weight with a successful identifier reading from the first measured weight with a successful identifier reading. In the example illustrated in FIG. 2, the weight increase would be 870 g−750 g=120 g. In another example embodiment, the control unit 104, 104A, 104B, 104C may send the information pairs associated with each weighing result to a management unit 100 without storing the information pairs permanently.

In an example embodiment, the weighing event starts when a change in weight is detected by the weighing device. Only then the food collecting point starts to read the identifier associated with the tray. Alternatively, the food collecting point may read the identifier independently from the weighing process. Similarly, the weighing event ends when there is no weight left on the weighing device. For example, at 222 the weighing result will be included in the weighing event even if it was not possible to read the identifier associated with the tray. The management unit 100 is configured to calculate a sub total result associated with a single food collecting point 102, 102A, 102B, 102C by subtracting the first weighing result associated with an indication that the identifier 144 associated with the tray 142 was read correctly from the last weighing result associated with an indication that the identifier 144 associated with the tray 142 was read correctly. The sub total result thus gives the weight of food collected by the user at the food collecting point 102, 102A, 102B, 102C.

Figure 3:
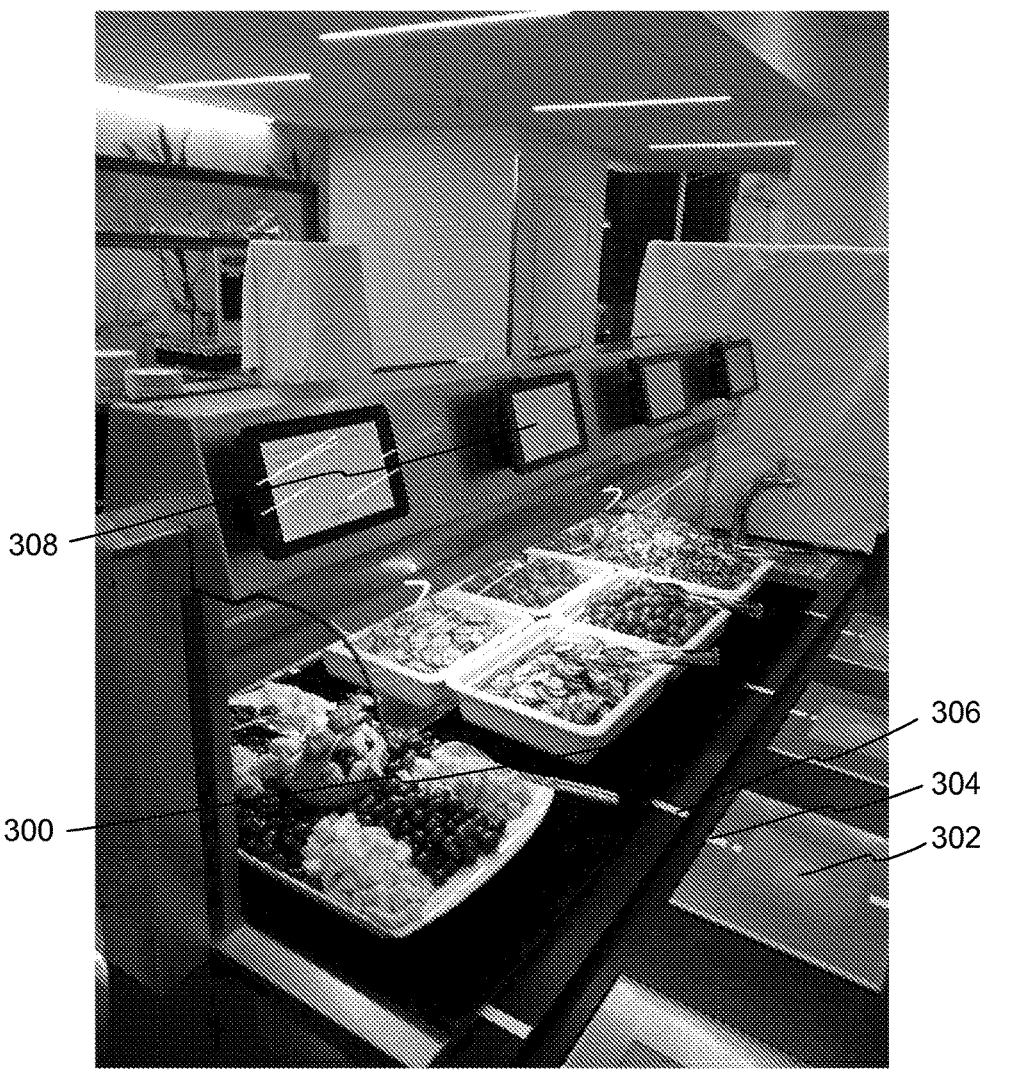
FIG. 3 illustrates an example illustrating four food serving points and four food collecting points according to an example embodiment.

FIG. 3 illustrates an example illustrating four food serving points 300 and four food collecting points. As illustrated in FIG. 3, two or more food collecting points may grouped into a larger food collecting point, for example, as a "food line". In other words, multiple dishes may be served at a single larger food collecting point. As illustrated in FIG. 3, weighing devices 302 may be integrated or built-in in the food line so that the user is able to easily move the tray between different food collecting points. Further, each tray may comprise at least one alignment mark configured to be aligned with a corresponding alignment mark 304, 306 arranged at the food serving point 300 and/or at the weighing device 302. A display 308 associated with the food serving point 300 may be configured to display, for example, at least one of the following: instructions for the weighing event at the food collecting point; a name of a dish served at the food serving point 300 associated with the food collecting point; and additional information about the dish served at the food serving point 300.

Further, each tray used in connection with the food collecting points may be associated with an identifier that may uniquely identify each tray among all trays used with the food collecting points. The identifier may be provided, for example, by a wirelessly readable tag, for example, a near field communication (NFC) tag or a radio frequency identification (RFID) tag. The tag may be fixedly attached to the tray, for example, glued on a bottom side of the tray or incorporated into the tray. The identifier may be provided, for example, also by a visually readable code or identifier, for example, a QR code, a bar code etc. In an example embodiment, the identifier may be a characteristic of the tray itself. In other words, a tag comprising the identifier may be fixedly attached to the tray, for example, glued on a bottom side of the tray or incorporated into the tray. In another example embodiment, the visually readable code or identifier may be, for example, printed on the tray or attached to the tray, for example, as a sticker. Yet in another example embodiment, the identifier may be provided by a separate device or a tag that may be associated with a user or with the user's device. For example, a mobile device put on the tray may provide the identifier. The identifier may thus be provided, for example, via a wireless transmission, for example, by using Bluetooth, RFID, NFC, Wi-Fi etc.

FIGS. 4A-4G illustrate exemplary views displayed by the display 110, 110A, 110B, 110C associated with the food collecting point 102, 102A, 102B, 102C. The display 110, 110A, 110B, 110C may display, for example, at least one of the dish name 400, ingredients 402 of the dish, and one or more additional characteristic associated with the dish (for example, that the dish is lactose free and/or glutenin free).

Figure 4A:
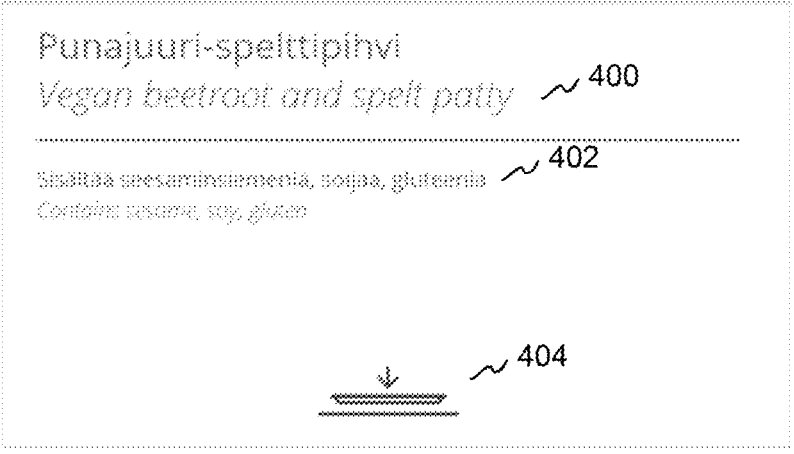
FIG. 4A illustrates a view on a display before a user places his/her tray on a weighing device associated with a food collecting point according to an example embodiment.

FIG. 4A illustrates an exemplary view on the display 110, 110A, 110B, 110C before a user places his/her tray on a weighing device associated with a food collecting point. A reference 400 refers to a section on the display where dish name information may be provided. A reference 402 refers to a section on the display where some additional information about the served dish may be provided. A reference 404 refers to a section on the display where instructions for the weighing event at the food collecting point may be provided to the user.

Figure 4B:
FIG. 4B illustrates a view on the display when the user has placed the tray on the weighing device according to an example embodiment.

FIG. 4B an exemplary a view on the display 110, 110A, 110B, 110C when the user has placed the tray on the weighing device. A reference 406 refers to a section on the display where information associated with the weighing process may be provided to the user.

Figure 4C:
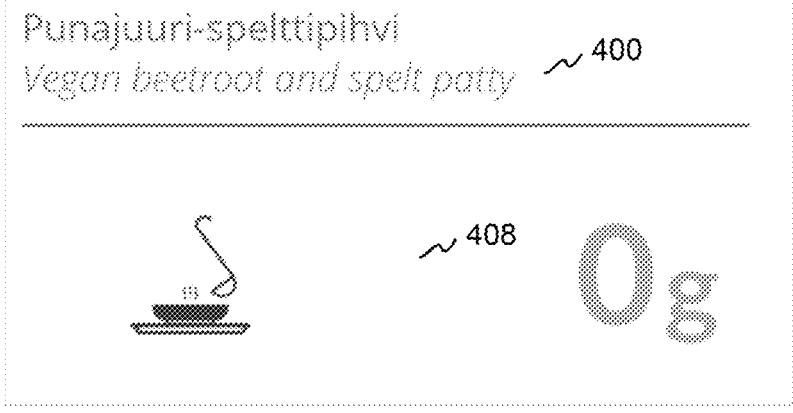
FIG. 4C illustrates a view on the display when the user has placed the tray on the weighing device according to an example embodiment.

FIG. 4C illustrates an exemplary view on the display 110, 110A, 110B, 110C when the user has placed the tray on the weighing device. A reference 408 refers to an indication on the display that a weight of the tray has been identified and weighed by the weighing device. Even if the tray has a certain weight, the weight indicated to the user on the display may be 0 g due to taring.

Figure 4D:
FIG. 4D illustrates a view on the display when the user is taking food on the plate according to an example embodiment.

FIG. 4D illustrates an exemplary view on the display 110, 110A, 110B, 110C when the user is taking food on the plate. A reference 410 refers to an instruction on the display to the user that, after taking food, the user is to set the plate back on the tray.

Figure 4E:
FIG. 4E illustrates a view on the display when the user is taking food on the plate according to an example embodiment.

FIG. 4E illustrates an exemplary view on the display 110, 110A, 110B, 110C when the user is taking food on the plate. A reference 412 refers to an instruction on the display to the user that, after taking food, the user is to set the plate back on the tray.

Figure 4F:
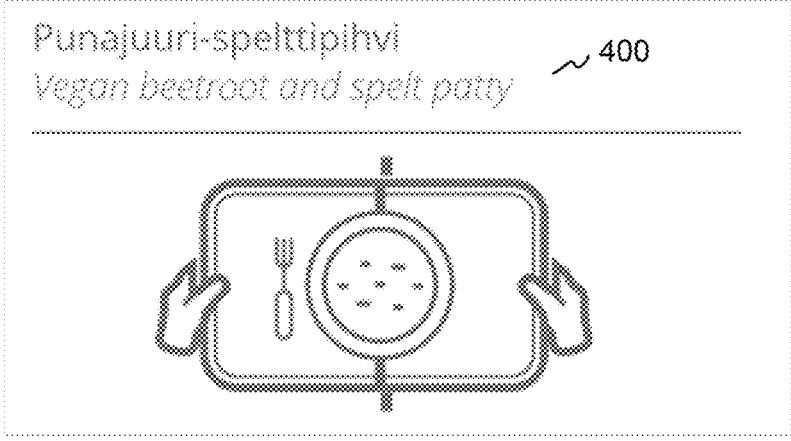
FIG. 4F illustrates a view on the display when the user has placed the tray on the weighing device but the tray is slightly misplaced according to an example embodiment.

FIG. 4F illustrates an exemplary view on the display 110, 110A, 110B, 110C when the user has placed the tray on the weighing device but the tray is slightly misplaced. The misplacement may mean that a reader associated with the food collecting point is not able to read the identifier associated with the tray. The view of the display may illustrate that the user should align an alignment mark visible on the tray with a corresponding alignment mark arranged at the food collecting point.

Figure 4G:
FIG. 4G illustrates a view on the display when the user has placed the plate back on the tray according to an example embodiment.

FIG. 4G illustrates an exemplary view on the display 110, 110A, 110B, 110C when the user has placed the plate back on the tray. A reference 414 refers to an indication on the display to the user that the food taken by the user has been weighed successfully. The indication may also indicate the weight of the food taken by the user.

Figure 5A:
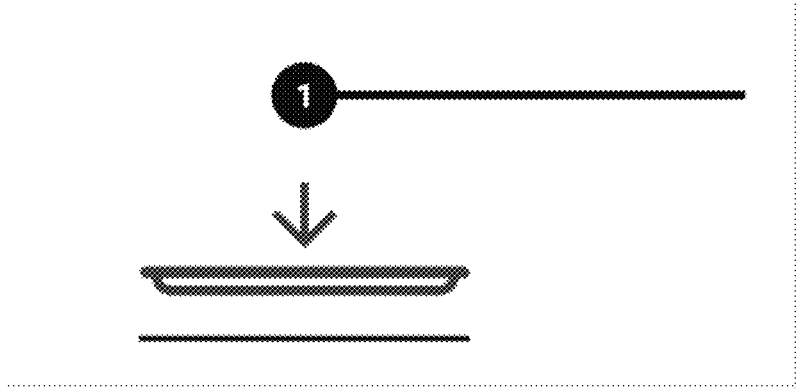
FIG. 5A illustrates a view displayed by a touch-sensitive display of an identification point according to an example embodiment.

FIGS. 5A-5E illustrate exemplary views displayed by a touch-sensitive display 120, 120A, 120B, 120C of the identification point 112, 112A, 112B, 112C according to an example embodiment. The identification point 112, 112A, 112B, 112C may comprise, for example, a checkout point where a user pays for the food he/she has taken. The identification point 112, 112A, 112B, 112C may comprise a first reader configured to read the identifier associated with the tray and optionally also a second reader configured to read a user identifier. FIG. 5A illustrates a view on the display 120, 120A, 120B, 120C before the user places his/her tray on a surface associated with the identification point.

Figure 5B:
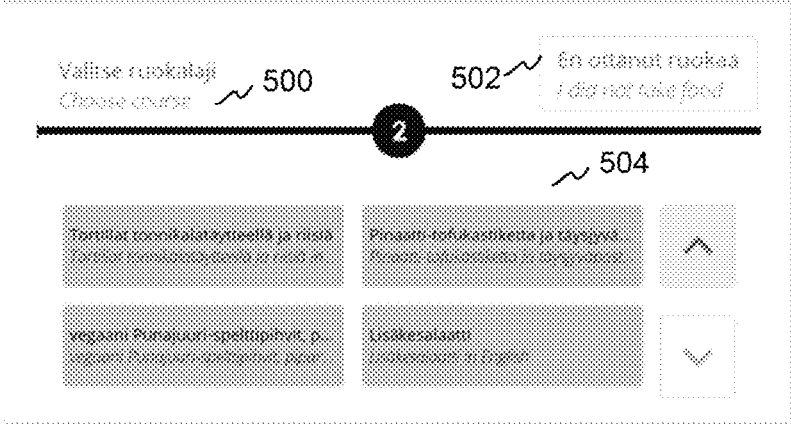
FIG. 5B illustrates a view on the display when the user has placed the tray on the surface associated with the identification point and when the identification point fails to identify any dish earlier associated with the identifier associated with the tray that the user is using according to an example embodiment.

FIG. 5B illustrates an exemplary view on the display 120, 120A, 120B, 120C when the user has placed the tray on the surface associated with the identification point and when the identification point 120, 120A, 120B, 120C fails to identify any dish earlier associated with the identifier associated, for example, with the tray that the user is using. References 500 and 502 illustrate some options for the user to proceed. A reference 504 refers to a section on the display where information associated with possible food selections may be provided to the user, and the user may select the correct dish.

Figure 5C:
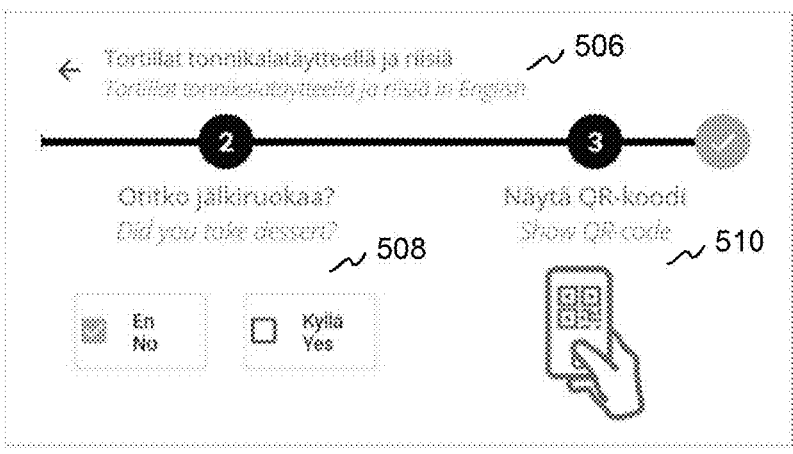
FIG. 5C illustrates a view on the display when the user has placed the tray on the surface associated with the identification point and when the identification point is able to identify a dish earlier associated with the identifier associated with the tray that the user is using according to an example embodiment.

FIG. 5C illustrates an exemplary view on the display 120, 120A, 120B, 120C when the user has placed the tray on the surface associated with the identification point and when the identification point is able to identify (indicated by a reference 506) a dish earlier associated with the identifier associated with the tray that the user is using. A reference 508 refers to an option with which the user is able to select a dessert to be added. A reference 510 prompts the user to show a QR code associated with the user or the user's mobile device. When the user provides the QR code, it is possible to link a specific user to a specific identifier associated with a tray.

Figure 5D:
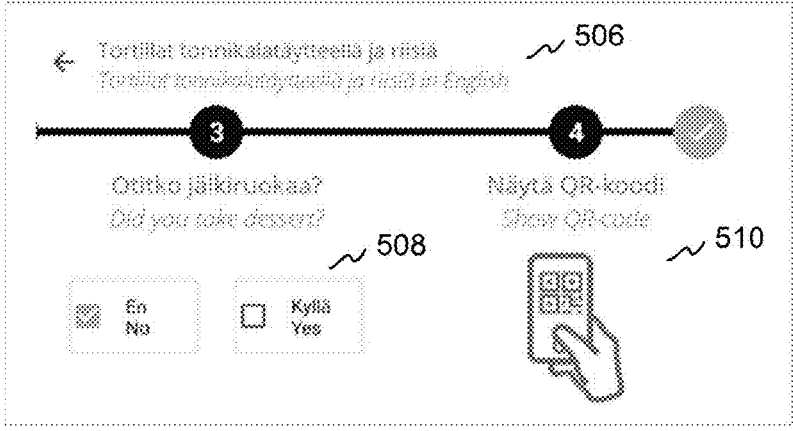
FIG. 5D illustrates a view on the display when the user has placed the tray on the surface associated with the identification point and when the identification point did not earlier identify any dish earlier associated with the identifier associated with the tray that the user is using according to an example embodiment.

FIG. 5D illustrates an exemplary view on the display 120, 120A, 120B, 120C when the user has placed the tray on the surface associated with the identification point and when the identification point 120, 120A, 120B, 120C did not earlier identify any dish earlier associated with the identifier associated with the tray that the user is using. The view illustrates a situation where the user has selected a dish (from the view illustrated in FIG. 5B). The reference 508 refers to an option with which the user is able to select a dessert to be added. The reference 510 prompts the user to show a QR code associated with the user or the user's mobile device. When the user provides the QR code, it is possible to link a specific user to a specific identifier associated with a tray and to the food selection.

Figure 5E:
FIG. 5E illustrates a view on the display when the identification point successfully read with the second reader a QR code provided by the user according to an example embodiment.

FIG. 5E illustrates an exemplary view on the display 120, 120A, 120B, 120C when the identification point 120, 120A, 120B, 120C successfully read with the second reader the QR code provided by the user. When the QR code has been successfully read (indicated by a reference 512), it is possible to link a specific user to a specific identifier associated with a tray and to any additional selection made by the user with the display 120, 120A, 120B, 120C.

Figure 6A:
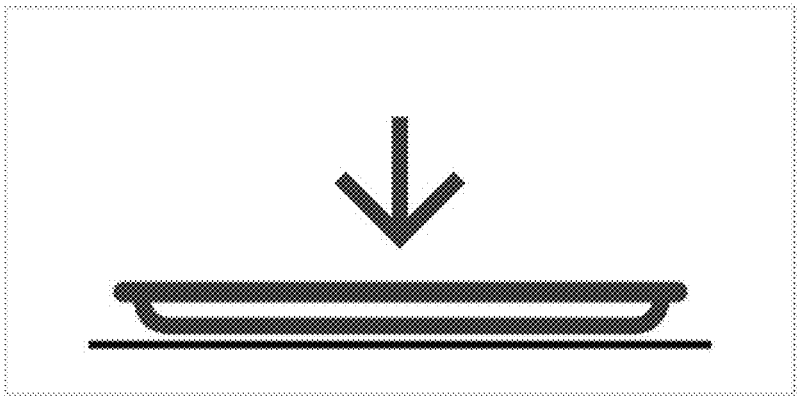
FIG. 6A illustrates a view displayed by a touch-sensitive display of a waste point according to an example embodiment.
Figure 6B:
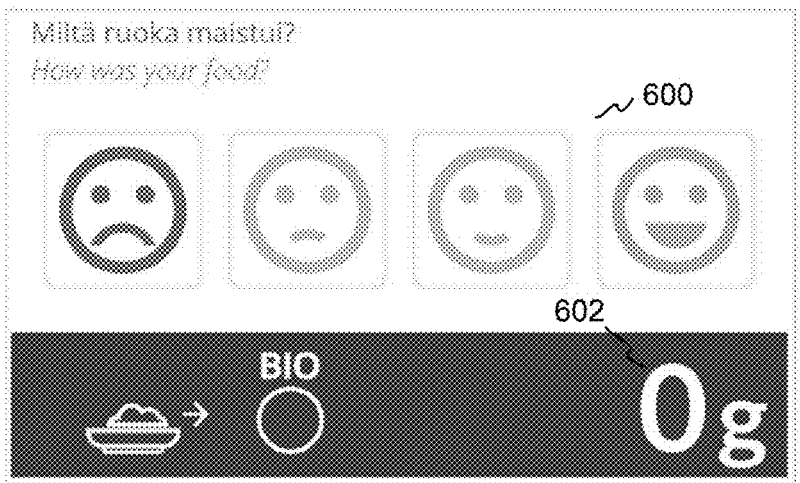
FIG. 6B illustrates a view on the display when the user has placed the tray on the surface associated with the waste point and when the waste point is able to identify a dish earlier associated with the identifier associated with the tray that the user is using according to an example embodiment.
Figure 6C:
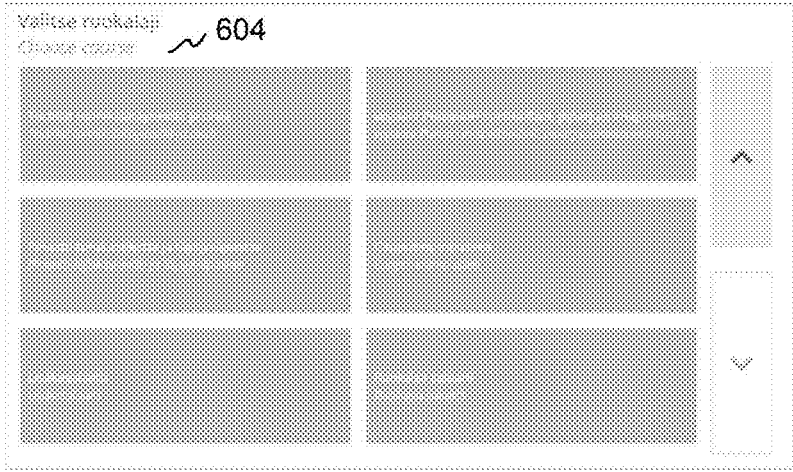
FIG. 6C illustrates a view on the display when the user has placed the tray on the surface associated with the waste point and when the waste point fails to identify a dish earlier associated with the identifier associated with the tray that the user is using according to an example embodiment.

FIGS. 6A-6C illustrate exemplary views displayed by a touch-sensitive display 130, 130A, 130B, 130C of the waste point 122, 122A, 122B, 122C. The waste point 122, 122A, 122B, 122C comprises a reader configured to read the identifier associated with the tray. FIG. 6A illustrates a view on the display 130, 130A, 130B, 130C before the user places his/her tray on a surface associated with the waste point.

FIG. 6B illustrates an exemplary view on the display 130, 130A, 130B, 130C when the user has placed the tray on the surface associated with the waste point and when the waste point 130, 130A, 130B, 130C is able to identify a dish earlier associated with the identifier associated with the tray that the user is using. The view may provide a review possibility (indicated by a reference 600) for reviewing or rating the consumed food. The waste point may also comprise a weighing device configured to weigh the amount of bio-waste left by the user to a waste collection point. Further, the view may also indicate (indicated by a reference 602) the weighted amount of biowaste left by the user. The amount of the biowaste left by the user may be associated to a specific user based the identifier associated with the tray if the user was identified earlier at the identification point 112, 112A, 112B, 112C. Further, even if the user was not identified at the identification point 112, 112A, 112B, 112C, the solution enables determination of the biowaste per each unidentified user per each dining time. As the amount of food taken by a given user is known and the identifier associated with the tray is available both the at the food collecting points 102, 102A, 102B, 102C and the waste point 130, 130A, 130B, 130C, it is possible to determine the proportion of biowaste from the collected food amount for each user regardless whether the user itself is identified or not.

FIG. 6C illustrates an exemplary view on the display 130, 130A, 130B, 130C when the user has placed the tray on the surface associated with the waste point 122, 122A, 122B, 122C and when the waste point 122, 122A, 122B, 122C fails to identify a dish earlier associated with the identifier associated with the tray that the user is using. The view prompts 604 the user to select a dish that the user ate. The view illustrated in FIG. 6B may be displayed after the user selection via the view illustrated in FIG. 6C.

Figure 7A:
FIG. 7A illustrates a management interface view for controlling a display according to an example embodiment.

FIG. 7A illustrates an exemplary view operating by the management interface 134 for controlling a display 130, 130A, 130B, 130C according to an example embodiment. The management interface view may be provided by a local server computer running a control software. Alternatively, the management interface view may be provided as a cloud-based service.

The management interface view enables display of three main views, a dish planning view 700, a calendar view 702 and a report view 704. The view illustrated in FIG. 7A is the dish planning view 700.

A reference 706 refers to a selection providing warm dishes served at the food serving points 138A, 138B, 138C. A reference 708 to a selection providing salads served at the food serving points 138A, 138B, 138C. A reference 710 refers to a virtual dish view where each virtual dish 712 corresponds to a specific food collecting point 102, 102A, 102B, 102C. A reference 714 refers to a virtual dish view where each virtual dish 714 corresponds to an additional food serving points which is not associated with a weighing device, for example, a grill point, a dessert point, a beverage point, a soup point, a salad point, a bread point etc.

Dishes to the virtual dish views 710, 714 and to the specific virtual dishes 712, 716 may be associated, for example, by selecting desired dishes from a dish view 718. The dish view 718 may display various dishes 720 that can be selected or edited by an operator.

Further, each dish 720 may be associated with a corresponding dish edit option 722 allowing the operator to edit contents of the dish 720 and a recipe edit option 724 allowing the operator to edit the recipe associated with the dish 720. The dish 720 may be allocated as a virtual dish 712 in the view 710, for example, by selecting the dish 720 and drag-and-dropping it on the virtual dish 712. It is evident that also other ways to allocate the dish 720 as the virtual dish 712 may be used, for example, by using selection menus associated with the dish 720.

Figure 7B:
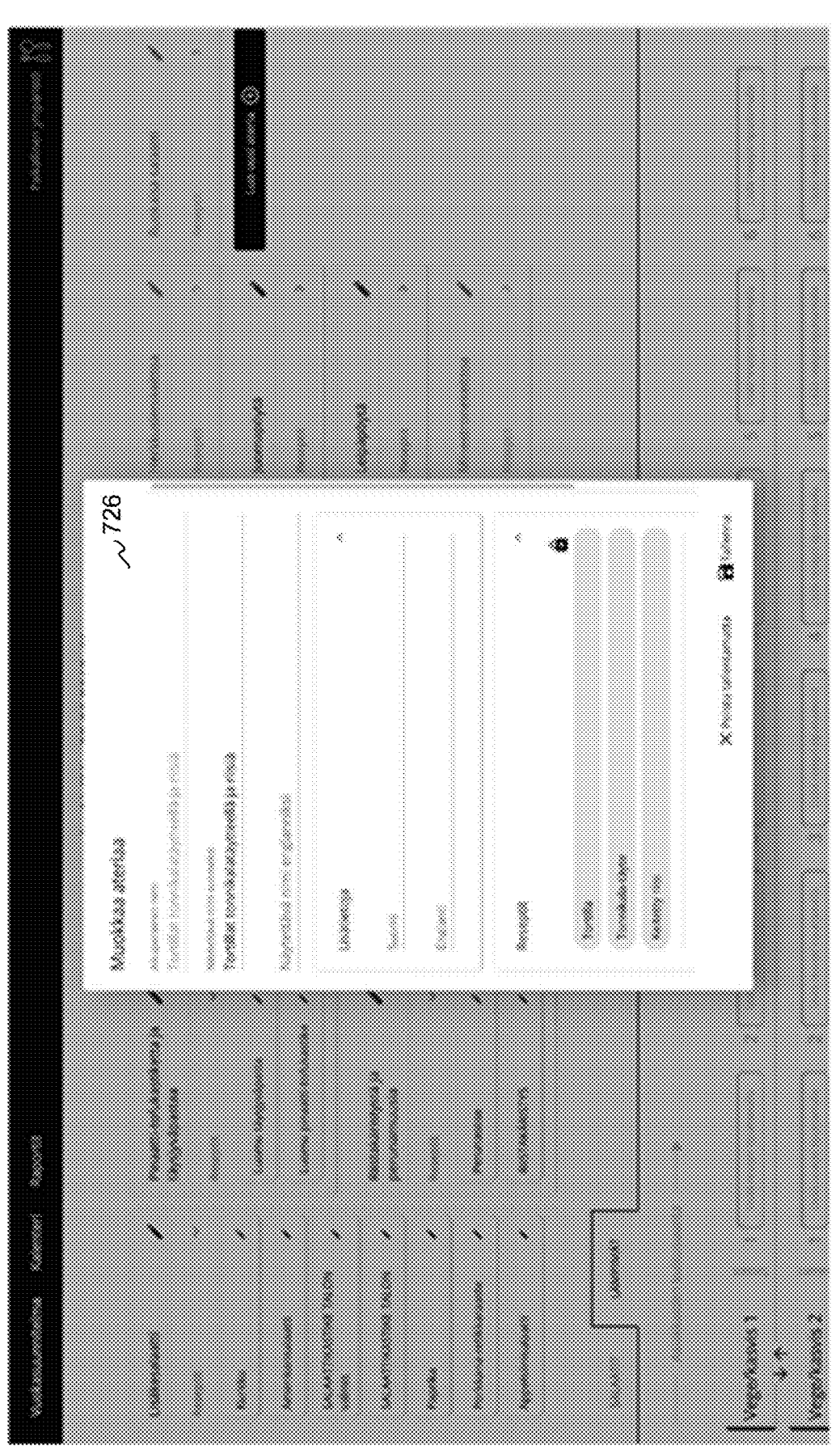
FIG. 7B illustrates a dish editing view according to an example embodiment.

FIG. 7B illustrates a dish editing view 726 according to an example embodiment. The dish editing view 726 may be provided when an operator selects the dish edit option 722 associated with the dish 720. Via the dish editing view 726, the operator may edit information relating to the dish 720, for example, a name to be displayed by the display 110, 110A, 110B, 110C, recipes associated with the dish 720 etc.

Figure 7C:
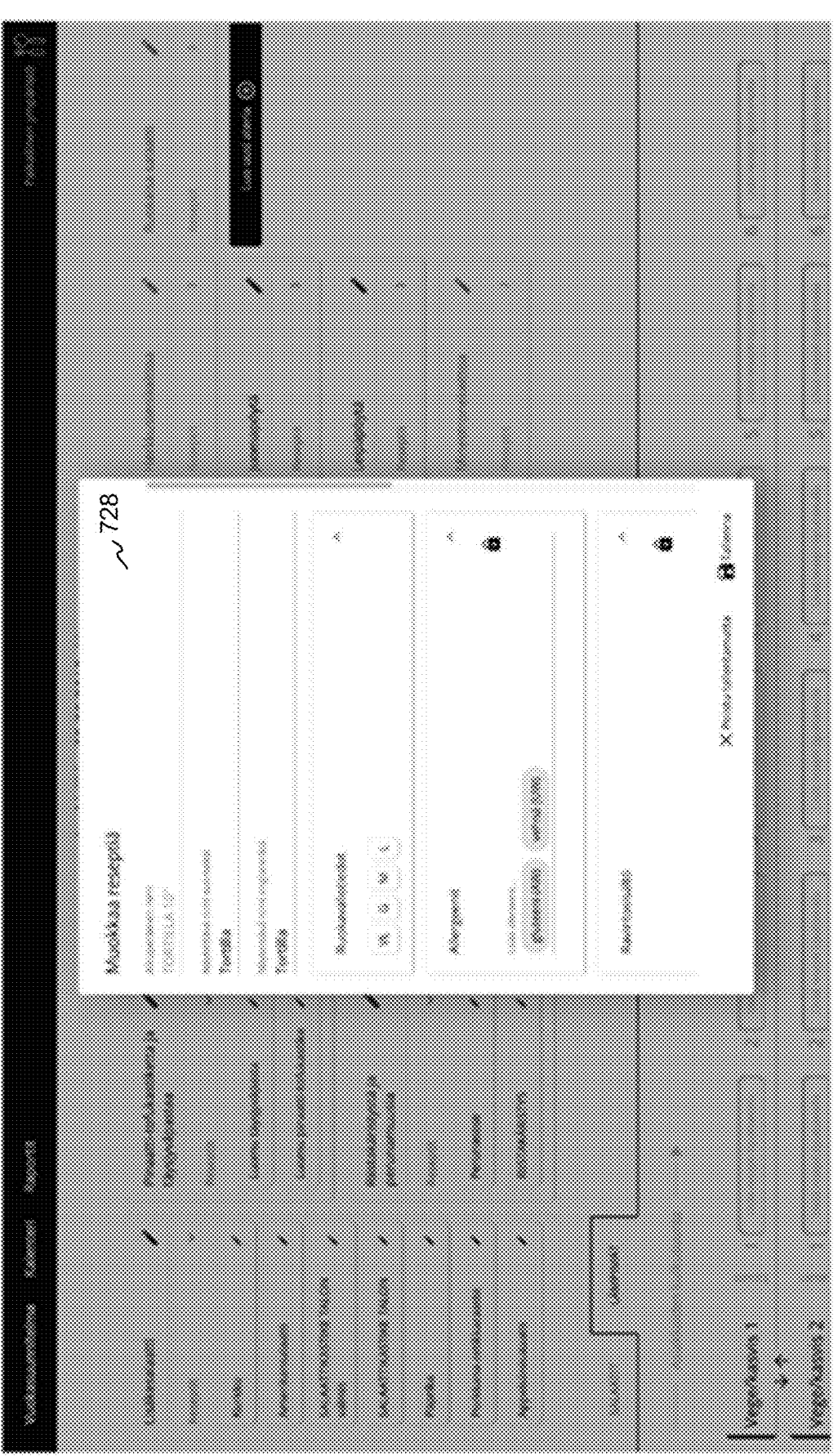
FIG. 7C illustrates a recipe editing view according to an example embodiment.

FIG. 7C illustrates a recipe editing view 728 according to an example embodiment. The recipe editing view 728 may be provided when an operator selects the recipe edit option 724 associated with the dish 720. Via the recipe editing view

728, the operator may edit information relating to the recipe, for example, allergen information, nutrition content information etc.

Figure 7D:
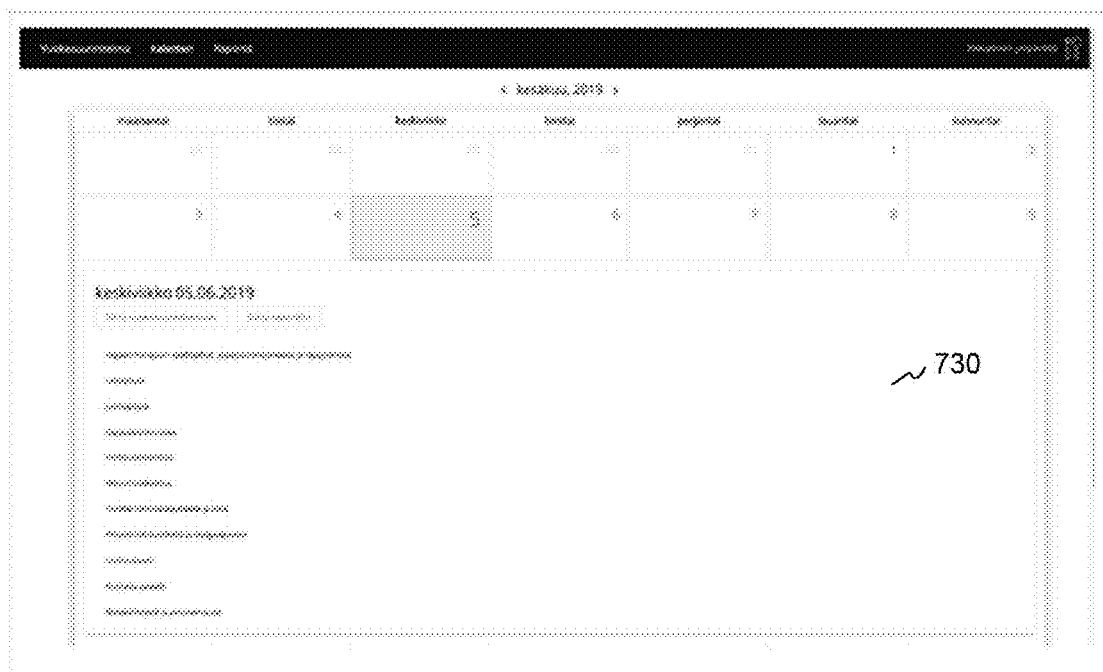
FIG. 7D illustrates a calendar view according to an example embodiment.

FIG. 7D illustrates a calendar view 730 according to an example embodiment. The calendar view 730 may display various dishes and salads allocated to each day.

Figure 7E:
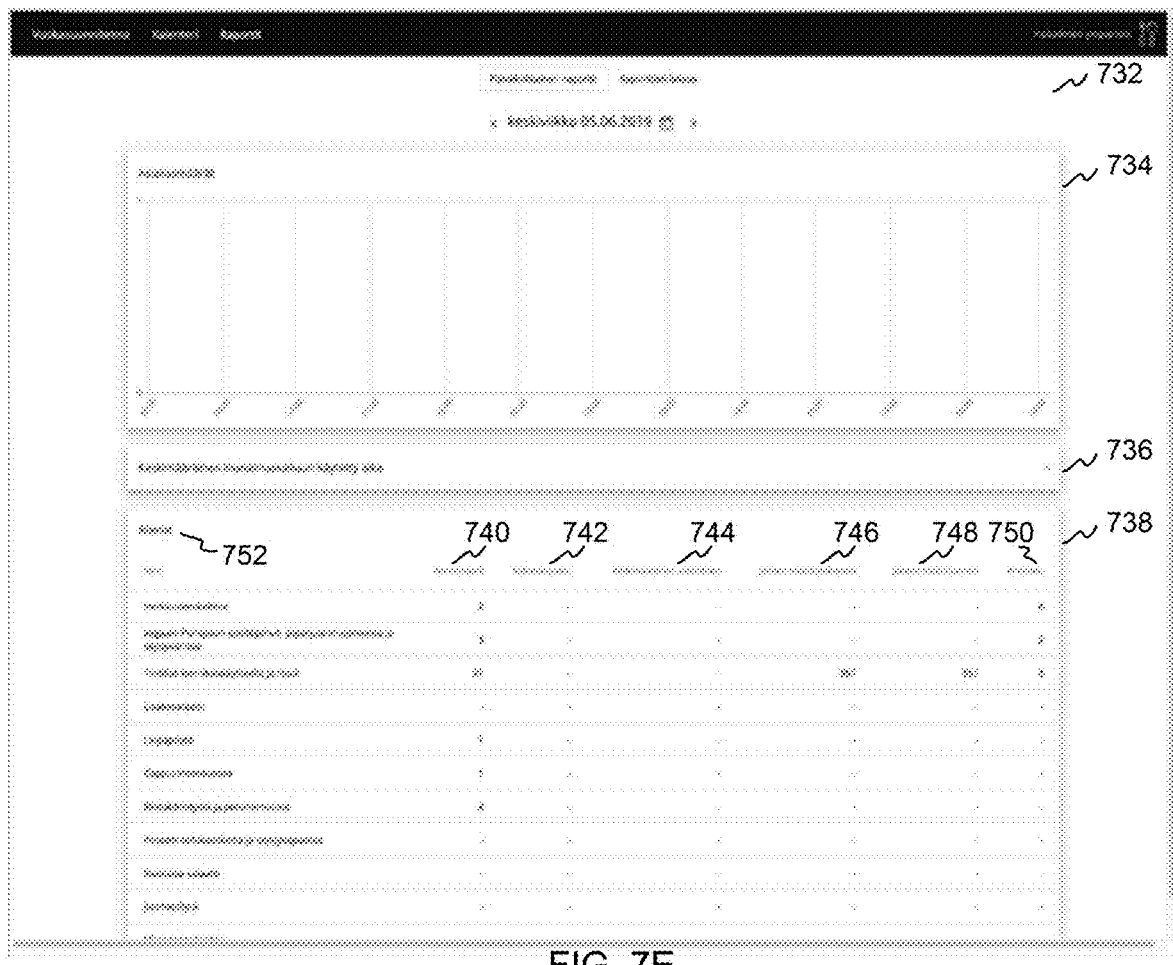
FIG. 7E illustrates a reporting view according to an example embodiment.
Figure 8:
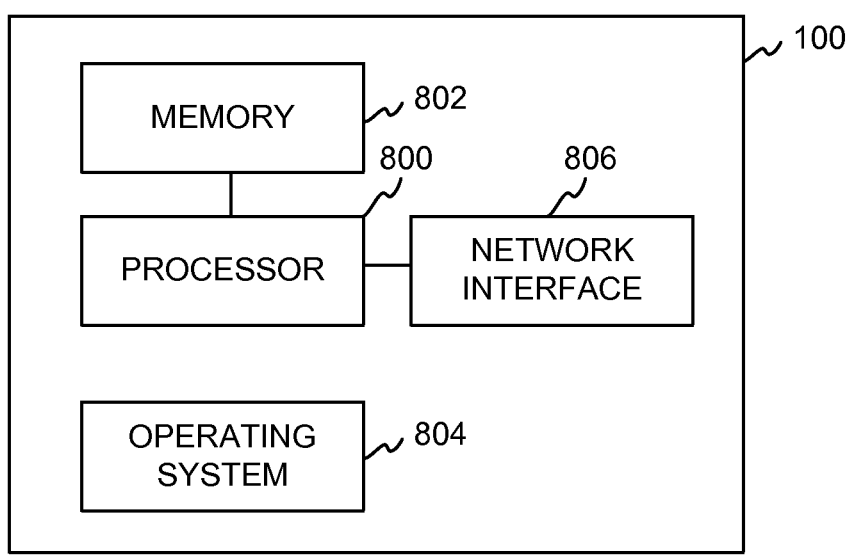
FIG. 8 illustrates a management unit depicting an exemplary system or apparatus that may include a variety of optional hardware and software components according to an example embodiment.

FIG. 7E illustrates a reporting view 732 according to an example embodiment. The reporting view 732 may display various reports associated with the food serving system. A sub-report 734 may show the number of customers as a function of time of day. The number of customers may be calculated, for example, by calculating the number of sessions associated with the trays 142. A sub-report 736 may show the average time that customers have used when dining. The average may be calculated, for example, based on the durations of the sessions associated with the trays 142. A sub-report 738 may show various parameters associated with the dishes 752:

the number of served portions 740 of a specific dish
the total weight 742 of a specific dish
an average size 744 of the portion of a specific dish
the total amount 746 of biowaste of a specific dish
the amount 748 of biowaste per a portion of a specific dish
a review 750 associated with a specific dish FIG. 8 illustrates a management unit 100 depicting an exemplary system or apparatus that may include a variety of optional hardware and software components. The illustrated system or apparatus can include one or more controllers or processors 800 (e.g., signal processor, microprocessor, ASIC, or other control and processing logic circuitry) for performing such tasks as signal coding, data processing, input/output processing, power control, and/or other functions, and a network interface 806 enabling wireless and/or wired data communication.

The illustrated system or apparatus can also include a memory or memories 802. The memory 802 can include a non-removable memory and/or a removable memory. The non-removable memory can include RAM, ROM, flash memory, a hard disk, or other well-known memory storage technologies. The removable memory can include flash memory or other well-known memory storage technologies. The memory 802 can be used for storing data and/or code for running an operating system 804 and/or one or more applications.

The system or apparatus may be configured to implement the various features, examples and embodiments illustrated, for example, in FIGS. 1-7 partially or completely. The functionality described herein can be performed, at least in part, by one or more computer program product components such as software components. The system or apparatus may comprise a single apparatus or multiple apparatuses, and it can provide a cloud-based service that is accessible via a data communication network, for example, the internet.

According to an example embodiment, the processor 800 may be configured by the program code which when executed performs the examples and embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). The system or apparatus may additionally include components and elements not disclosed in FIG. 8, for example, input/output interfaces, a receiver, a transmitter, a transceiver, input/output ports, a display etc.

Any combination of the illustrated components disclosed in FIG. 8, for example, at least one of the processor 802 and the memory 804 may constitute means for receiving weighing results associated with an identifier associated with a tray from at least one control unit associated with a plurality of food collecting points; and means for generating a total result associated with the identifier based on the weighing results associated with the identifier the tray.

Those skilled in the art should understand that each step or operation, or any combinations of the steps or operation mentioned above, can be implemented by various means, such as hardware, firmware, and/or software. As an example, one or more of the steps or operation described above can be embodied by computer or processor executable instructions, data structures, program modules, and other suitable data representations. Furthermore, the computer executable instructions which embody the steps or operation described above can be stored on a corresponding data carrier and executed by at least one processor like the processor 800 included in the apparatus. This data carrier can be implemented as any computer-readable storage medium configured to be readable by said at least one processor to execute the computer executable instructions. Such computer-readable storage media can include both volatile and nonvolatile media, removable and non-removable media. By way of example, and not limitation, the computer-readable media comprise media implemented in any method or technology suitable for storing information. In more detail, the practical examples of the computer-readable media include, but are not limited to information-delivery media, RAM, ROM, EEPROM, flash memory or other memory technology (for example, solid state drive (SSD) or NVM Express (NVMe)), CD-ROM, digital versatile discs (DVD), holographic media or other optical disc storage, magnetic tape, magnetic cassettes, magnetic disk storage, and other magnetic storage devices.

Although the example embodiments of the present invention are disclosed herein, it should be noted that any various changes and modifications could be made in the embodiments of the present invention, without departing from the scope of legal protection which is defined by the appended claims. In the appended claims, the mention of elements in a singular form does not exclude the presence of the plurality of such elements, if not explicitly stated otherwise.

The invention claimed is:

1. A food serving system comprising:
a plurality of food serving points configured to serve food;
a plurality of food collecting points configured to receive a tray, each food collecting point being associated with a food serving point, a control unit, a weighing device connected to the control unit and configured to weigh a tray of a user, and a reader connected to the control unit and configured to read an identifier, different food collecting points of the plurality of food collecting points being configured to serve different food portions;
wherein each control unit associated with the plurality of food collecting points is configured to start a weighing event when detecting a change in weight with the weighing device associated with the food collecting point, in response to the start, associate the identifier read with the reader associated with the food collecting point with the weighing event, generate at least one weighing result with the weighing device associated with the food collecting point, and stop the weighing event when detecting no weight with the weighing device associated with the food collecting point; and
a management unit configured to receive weighing results associated with the identifier from at least one control unit associated with the plurality of food collecting points, the weighing results comprising separate weighing results of different food portions collected from different food collecting points, and generate a total result associated with the identifier based on the weighing results.

2. A food serving system according to claim 1, wherein the management unit is configured to start a new session when detecting the identifier for the first time.

3. A food serving system according to claim 2, further comprising a tray returning point comprising a reader configured to read an identifier when the tray is returned, and the management unit is configured to end an existing session associated with the identifier in response to the reading.

4. A food serving system according to claim 2, wherein the management unit is configured to end an existing session associated with the identifier when failing to register the identifier at the tray returning point within a predetermined period of time.

5. A food serving system according to claim 1, further comprising a waste point comprising an associated reader configured to read the identifier when the tray is returned, wherein the waste point further comprises a waste collection point and a weighing device configured to weigh the amount of biowaste left by a user to the waste collection point, wherein management unit is configured to receive from the waste point the identifier and weighed weight of the biowaste.

6. A food serving system according to claim 1, wherein the management unit is configured to receive from a food collecting point at least one information pair associated with a weighing result of a tray, wherein each information pair comprises a weighing result and an indication whether the identifier was read correctly or incorrectly, and the management unit is configured to calculate a sub total result associated with the food collecting point by subtracting the first weighing result associated with an indication that the identifier was read correctly from the last weighing result associated with an indication that the identifier was read correctly.

7. A food serving system according to claim 1, further comprising a display associated with a food collecting point, wherein the management unit is configured to control the display to display at least one of the following:
instructions for the weighing event at the food collecting point;
a name of a dish served at a food serving point associated with the food collecting point; and
additional information about the dish served at the food serving point.

8. A food serving system according to claim 1, further comprising an identification point comprising a first reader configured to read the identifier and a second reader configured to read a user identifier, wherein the management unit is configured to receive from the identification point the identifier and the user identifier, and link the identifier with the user identifier.

9. A food serving system according to claim 8, wherein the management unit is configured to receive from the identification point at least one additional food associated selection and link the at least one additional food associated selection with the user identifier.

10. A food serving system according to claim 1, wherein the identifier is associated with at least one of the tray, a user or a mobile device of the user.

11. A method comprising:

receiving weighing results associated with an identifier from at least one control unit associated with a plurality of food collecting points, the weighing results comprising separate weighing results of different food portions collected from different food collecting points of the plurality of food collecting points; and generating a total result associated with the identifier based on the weighing results associated with the identifier.

12. A method according to claim 11, further comprising:

starting a new session when detecting the identifier for the first time.

13. A method according to claim 12, further comprising:

receiving, from a tray returning point, an identifier when the tray is returned; and ending an existing session associated with the identifier.

14. A method according to claim 12, further comprising:

ending an existing session associated with the identifier when failing to receive the identifier from the tray returning point within a predetermined period of time.

15. A method according to claim 11, further comprising:

receiving from a food collecting point at least one information pair associated with a weighing result of a tray, wherein each information pair comprises a weighing result and an indication whether the identifier was read correctly or incorrectly; and calculating a sub total result associated with the food collecting point by subtracting the first weighing result associated with an indication that the identifier was read correctly from the last weighing result associated with an indication that the identifier was read correctly.

16. A method according to claim 11, further comprising:

controlling a display associated with a food collecting point to display at least one of the following:

instructions for the weighing event at the food collecting point;

a name of a dish served at a food serving point associated with the food collecting point; and additional information about the dish served at the food serving point.

17. A method according to claim 11, further comprising:

receiving from an identification point the identifier and a user identifier; and linking the identifier with the user identifier.

18. A method according to claim 17, further comprising:

receiving from the identification point at least one additional food associated selection; and linking the at least one additional food associated selection with the user identifier.

19. A method according to claim 11, wherein the identifier is associated with at least one of the tray, a user or a mobile device of the user.

20. A computer program comprises program code which, when executed by at least one processor, performs the method of claim 11.

21. A computer-readable medium comprising a computer program comprising program code which, when executed by at least one processor, performs the method of claim 11.

22. An apparatus comprising:

at least one processor; and at least one memory including computer program code;

the at least one memory and the computer program code configured to, with the at least one processor, cause the user node to at least perform:

receiving weighing results associated with an identifier from at least one control unit associated with a plurality of food collecting points, the weighing results comprising separate weighing results of different food portions collected from different food collecting points of the plurality of food collecting points; and generating a total result associated with the identifier based on the weighing results associated with the identifier.

* * * * *